United States Patent
Cai et al.

(10) Patent No.: US 11,725,979 B2
(45) Date of Patent: *Aug. 15, 2023

(54) LABORATORY PAPER-STRUCTURED WEIGHING KIT

(71) Applicant: CHEMRUS INC., Dover, MA (US)

(72) Inventors: Jianjian Cai, Dover, MA (US); Xiaogao Liu, Dover, MA (US)

(73) Assignee: Chemrus, Inc., Garnet Valley, PA (US)

( * ) Notice: Subject to any disclaimer, the term of this patent is extended or adjusted under 35 U.S.C. 154(b) by 147 days.

This patent is subject to a terminal disclaimer.

(21) Appl. No.: 17/333,323

(22) Filed: May 28, 2021

(65) Prior Publication Data
US 2021/0285813 A1 Sep. 16, 2021

Related U.S. Application Data

(63) Continuation of application No. 16/484,818, filed as application No. PCT/US2018/017522 on Feb. 9, 2018, now Pat. No. 11,041,750.

(60) Provisional application No. 62/456,959, filed on Feb. 9, 2017.

(51) Int. Cl.
*G01G 21/22* (2006.01)
*B01L 3/00* (2006.01)

(52) U.S. Cl.
CPC .............. *G01G 21/22* (2013.01); *B01L 3/505* (2013.01); *B01L 2300/0858* (2013.01); *B01L 2300/126* (2013.01)

(58) Field of Classification Search
CPC . G01G 21/22; B01L 3/505; B01L 2300/0858; B01L 2300/126

USPC .......................................................... 177/253
See application file for complete search history.

(56) References Cited

U.S. PATENT DOCUMENTS

| | | | |
|---|---|---|---|
| 3,169,643 A | 2/1965 | Roberts | |
| 5,721,022 A | 2/1998 | Morita et al. | |
| 7,037,471 B1 | 5/2006 | Perlman | |
| 11,041,750 B2 * | 6/2021 | Cai | G01G 21/22 |
| 2013/0340882 A1 | 12/2013 | Ehrbar et al. | |

FOREIGN PATENT DOCUMENTS

WO 2016/134155 8/2016

OTHER PUBLICATIONS

International Search Report and Written Opinion for PCT/US2018/017522 dated Jun. 19, 2018.
International Preliminary Report on Patentability for PCT/US2018/017522 dated Aug. 22, 2018.

* cited by examiner

*Primary Examiner* — Jacques M Saint Surin
(74) *Attorney, Agent, or Firm* — Honigman LLP

(57) ABSTRACT

A laboratory weighing kit comprises two layers: a disposable paper-structured weighing boat in the upper layer and a corresponding-shaped weighing base in the lower layer. The weighing boat has a sample loading portion in the rear to carry chemicals or samples, and a funnel portion in the front to transfer samples. In order to consolidate storage space, either the front funnel can be opened to two portions or the back wall of the weighing boat is opened. The weighing boat can be creased to form a permanent fold. The weighing boat in the upper layer can be either removable from or permanently attached to the weighing base in the lower layer.

15 Claims, 6 Drawing Sheets

LABORATORY PAPER-STRUCTURED WEIGHING KIT

CLAIM OF PRIORITY

This application is a continuation of prior U.S. patent application Ser. No. 16/484,818, filed Aug. 8, 2019, which claims priority under 35 USC 371 to International Application No. PCT/US2018/017522, filed on Feb. 9, 2018, which claims the benefit of prior U.S. Provisional Application No. 62/456,959 filed on Feb. 9, 2017, each of which is incorporated by reference in its entirety.

BACKGROUND

1. Field of the Invention

The present invention relates to the laboratory weighing kit, particularly the two-layer weighing kit for transporting chemicals or samples.

2. Related Art

The disposable weighing container is an essential laboratory device that holds chemicals or samples. The prior art flat weighing paper is most commonly used in chemistry and biological laboratories. It is common practice to place a piece of flat weighing paper on a scale, add the chemicals or sample onto the weighing paper for quantitative weighing, and then transfer the content into a flask or vial. Because of the flimsy composure of the flat weighing paper, extra care must be taken when transferring the content to and from the paper. This is especially true when trying to pour the contents from the flat paper into a small opening on a flask or vial. Any resulting spilling may negatively affect the accuracy and overall result of the chemistry experiment. An alternative disposable polymer-structured weighing boat is also commonly used in chemistry laboratories. Despite being convenient for holding chemicals or samples, it is not great for transferring the contents due to its rigid edges. The polymer or glass material typically found in this boat can also disturb the organic compounds due to static electricity properties. The most important consideration, however, is the environmental issues of the disposable plastic waste. In addition, the reusable glass boat needs to be cleaned afterwards, which takes time and runs the risk of breakage. By replacing both these materials with flat weighing paper, the environmental footprint is drastically reduced and the need for storing large amounts of glassware is eliminated. Due to its lower cost, anti-static properties, and environmentally friendly traits, paper is the best disposable weighing material. However, there are some drawbacks to consider. Paper is more difficult for handling samples due to its flimsy nature. It also holds less content due to having flat edges. Lastly, it is difficult to transfer samples into small openings since there is no funnel shape to facilitate efficient transfer of materials. Despite the shortcomings of paper-based weighing container, it is still a great option due to its positive properties.

SUMMARY OF THE INVENTION

In the invention, the weighing kit comprises two layers. The upper layer is a disposable weighing boat, which has a sample loading portion in the rear to hold chemicals and a funnel portion in the front to transfer samples. To better optimize the weighing boat for storage, the funnel portion and the back wall can be opened. This can allow the boats to stack for more efficient storage and transportation. The opened funnels can be assembled to a closed funnels in several ways, and the final result can be a disposable paper-structured weighing boat with trapezoid-shaped permanent fold lines. The lower layer can be a denser base to support the softer upper layer. The trapezoid-shaped weighing base has two side walls, a back wall, and a funnel holder to stably hold the corresponding shaped upper layer.

BRIEF DESCRIPTION OF DRAWINGS

The present application can be best understood by referencing the following description and the accompanying figures.

DETAILED DESCRIPTION OF PREFERRED EMBODIMENTS

Figure 1A:
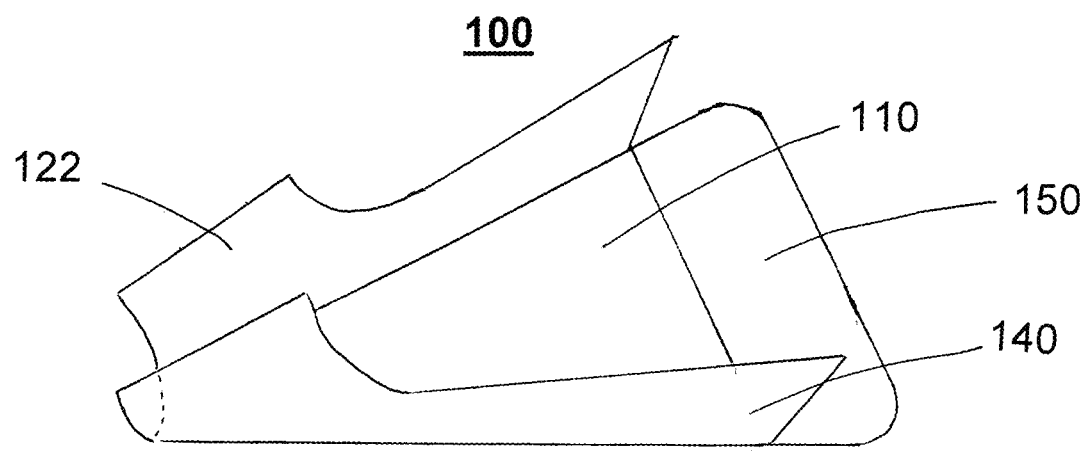
FIG. 1A is a perspective view of the trapezoid-shaped disposable weighing boat having an opened funnel portion in the front and an opened back wall according to the present invention.
Figure 1B:
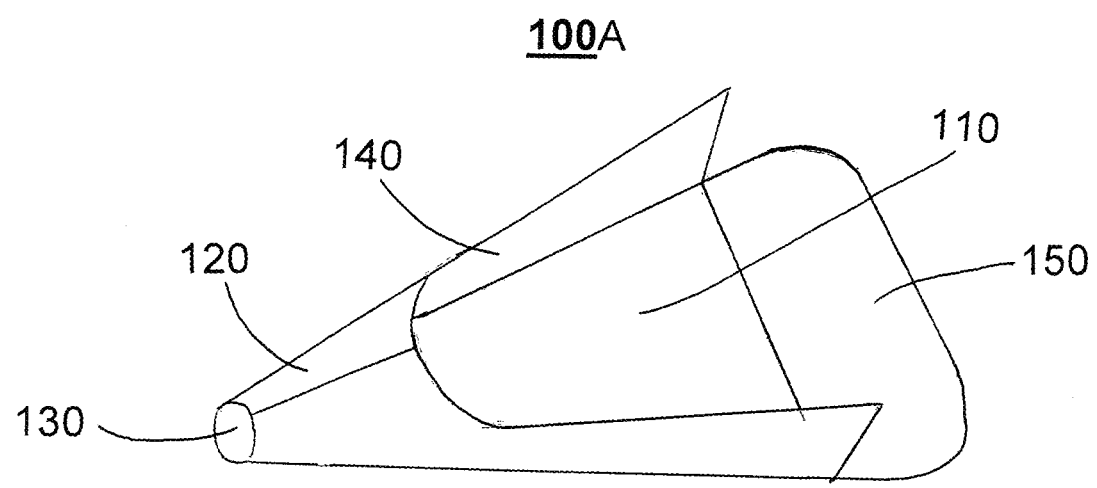
FIG. 1B is a perspective view of the trapezoid-shaped disposable weighing boat having a funnel portion in the front and an opened back wall according to the present invention.
Figure 2A:
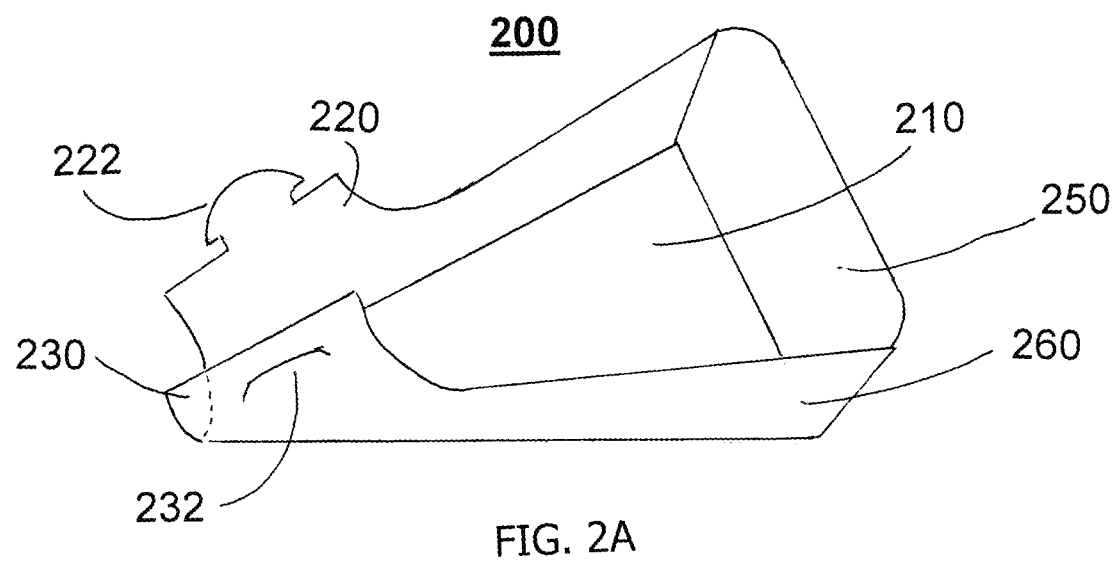
FIG. 2A is a perspective view of the trapezoid-shaped disposable weighing boat having an opened funnel portion in the front according to the present invention.
Figure 2B:
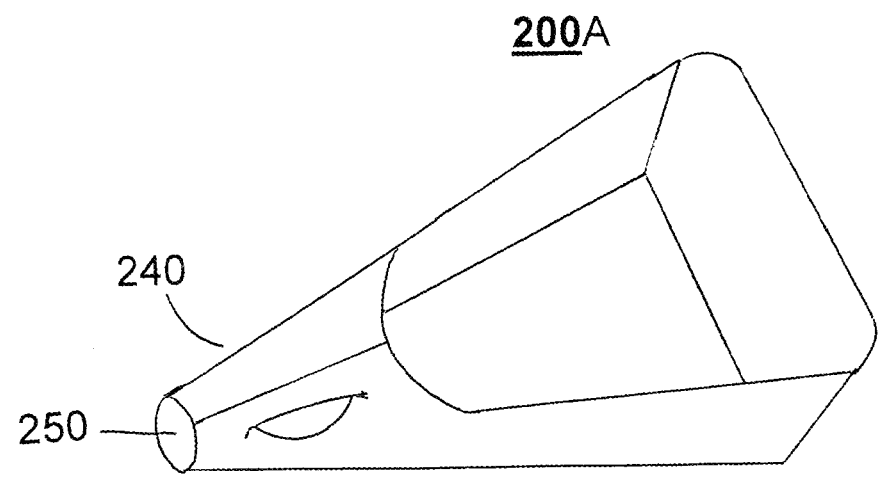
FIG. 2B is a perspective view of the trapezoid-shaped disposable weighing boat having an assembled funnel portion in the front according to the present invention.
Figure 3A:
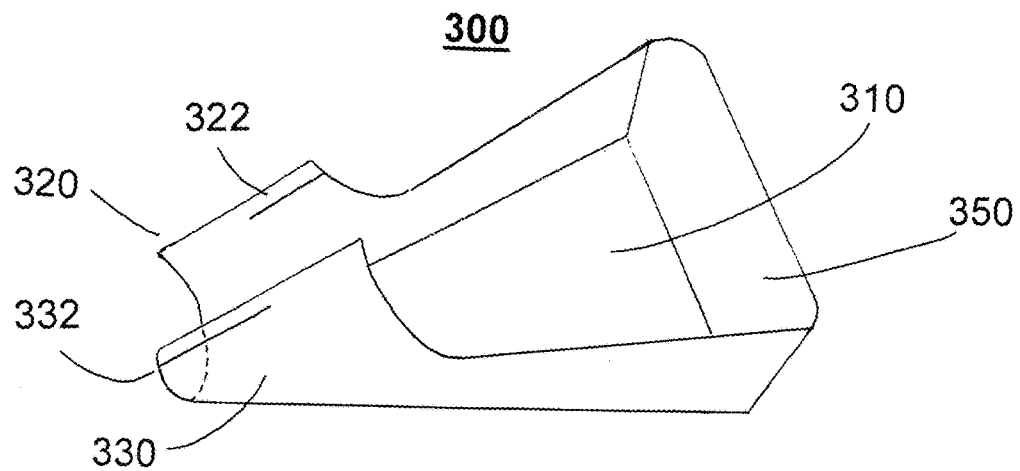
FIG. 3A is a perspective view of an alternative trapezoid-shaped disposable weighing boat having an opened funnel portion in the front according to the present invention.
Figure 3B:
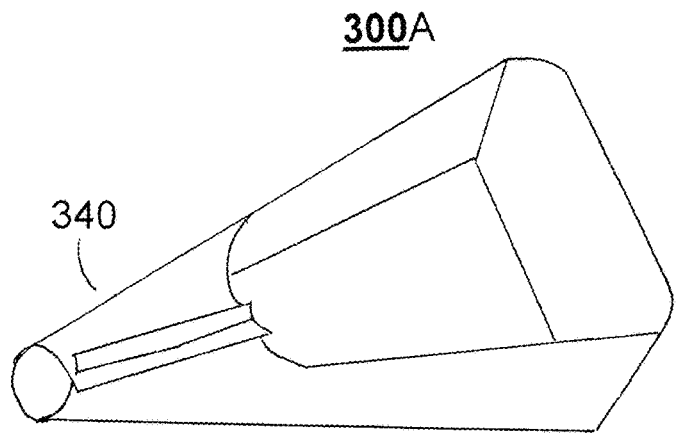
FIG. 3B is a perspective view of an alternative trapezoid-shaped disposable weighing boat with an assembled funnel portion in the front according to the present invention.
Figure 4:
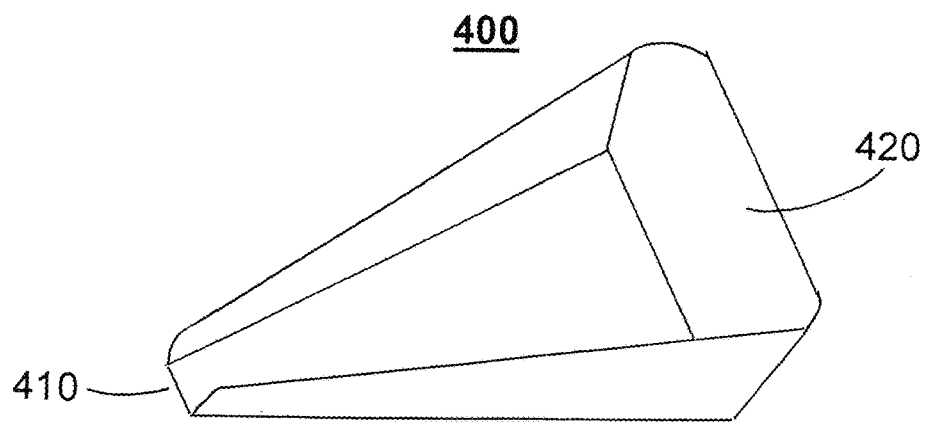
FIG. 4 is a perspective view of the trapezoid-shaped disposable weighing boat according to the present invention.
Figure 5A:
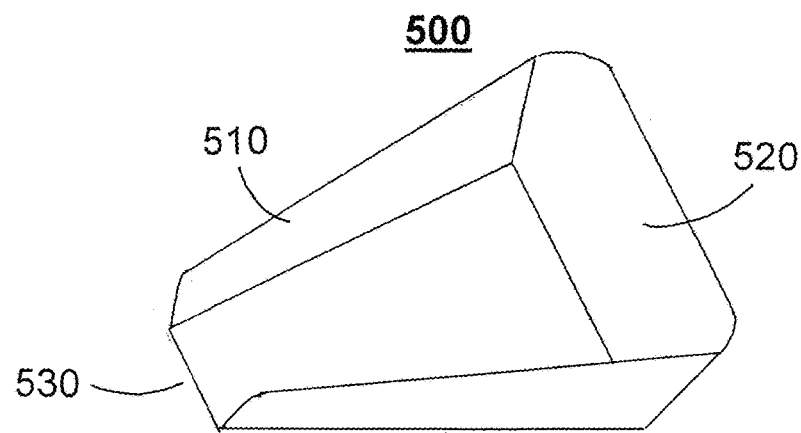
FIG. 5A is a perspective view of the trapezoid-shaped weighing base in the front according to the present invention.
Figure 5B:
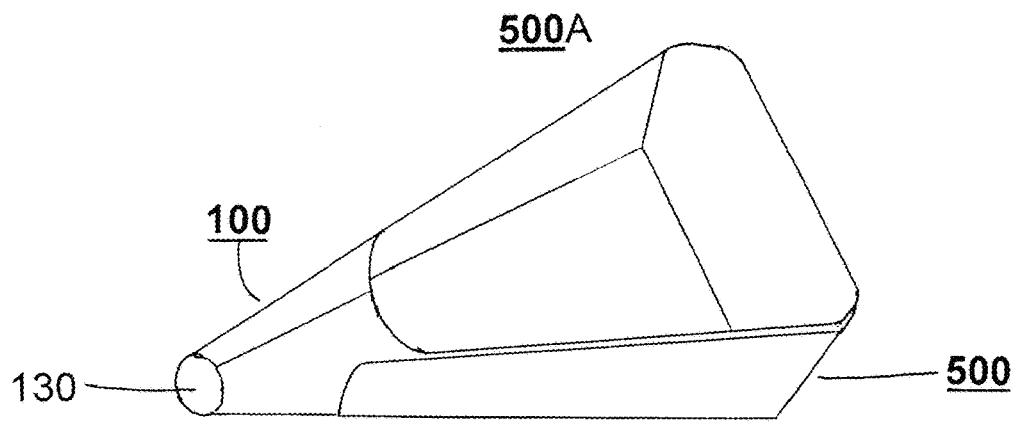
FIG. 5B is a perspective view of the trapezoid-shaped weighing kit comprising a weighing boat with a funnel portion in the upper layer and a weighing base in the lower layer according to the present invention.
Figure 5C:
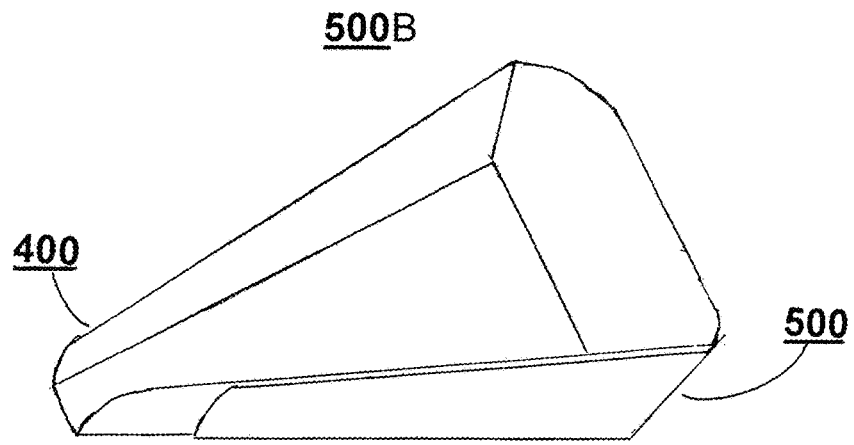
FIG. 5C is a perspective view of the trapezoid-shaped weighing kit comprising a weighing boat in the upper layer and a weighing base in the lower layer according to the present invention.

The present invention relates to the disposable paper-structured weighing kit. The kit is described in detail below:

With reference to FIG. 1A, a first embodiment of the trapezoid-shaped disposable weighing boat, indicated by numeral 100, is shown. The weighing boat 100 has a sample loading portion 110, two opened funnel portions 122 in the front, two side walls 140 and an opened back wall 150. The boat 100 with opened funnel 122 can be stacked to save space for storage and transportation. The opened funnel portions 122 can be either glued together or stuck with adhesive tape to form a closed funnel piece 120 for transferring chemicals as shown in FIG. 1B. The weighing boat 100A with an opened back wall 150 can also be stacked to save space. The weighing boat 100 with permanent boat-shaped fold lines can be easily assembled to a boat shape and perfectly fits the corresponding shaped weighing base. The weighing boat 100A preferably is made of the lower cost, anti-static weighing paper. However, the polymer or metal foil also is an option. It should be understood that the contouring and relative dimensions of the disposable weighing boats 100 and 100A are shown for exemplary purposes only. FIG. 2A illustrates an embodiment of a trapezoid-shaped disposable weighing boat, generally indicated by numeral 200. The weighing boat 200 has a sample loading portion 210, two opened funnel portions 220 and 230, and a closed back wall 250. The opened funnel portion is for stacking purpose. The insert 222 of one funnel portion 220 is inserted into the split 232 of another funnel portion 230 to form a closed funnel 240 indicated by numeral 200A as shown in FIG. 2B. The lines of the back wall 250 and side walls 260 are creased to form a permanent fold for easy assembly of the weighing boat, which can perfectly fit the corresponding shaped weighing base. FIG. 3A illustrates an alternative embodiment of the trapezoid-shaped disposable weighing boat indicated by numeral 300. The weighing boat 300 has a sample loading portion 310, a closed back wall 350 and an opened funnel portion in the front comprising portions 320 and 330. The portion 320 has a split 322 in the rear side and the portion 330 has a split 332 in the front side. The splits 322 and 332 are cross-inserted together to form a closed funnel 340 indicated by numeral 300A as shown in FIG. 3B. The opened funnel portion is also for stacking purpose. FIG. 4 shows an alternative embodiment of the trapezoid-shaped disposable weighing boat, indicated by numeral 400. The weighing boat 400 has a U-typed opening 410, which is convenient for transferring chemicals or samples into a container with a wider opening. However, it is difficult to transfer samples into a smaller opening. FIG. 5A illustrates an embodiment of the equilateral trapezoid-shaped weighing base 500 having two side walls 510 and a back wall 520. The weighing base 500 supports the corresponding shaped soft weighing paper boat 100A or 400 to form a weighing kit 500A or 500B as shown in FIGS. 5B and 5C, respectively. The weighing boat 100A fits the corresponding shaped weighing base 500, in which the funnel opening 130 is out of the base opening 530, so that the sample is transferred without contaminating the weighing base 500. The walls 140 and 150 of weighing boat 100A is a little higher than the walls 510 and 520 of weighing base 500. The weighing base 500 is either disposable or re-usable depending on its cost.

Figure 6A:
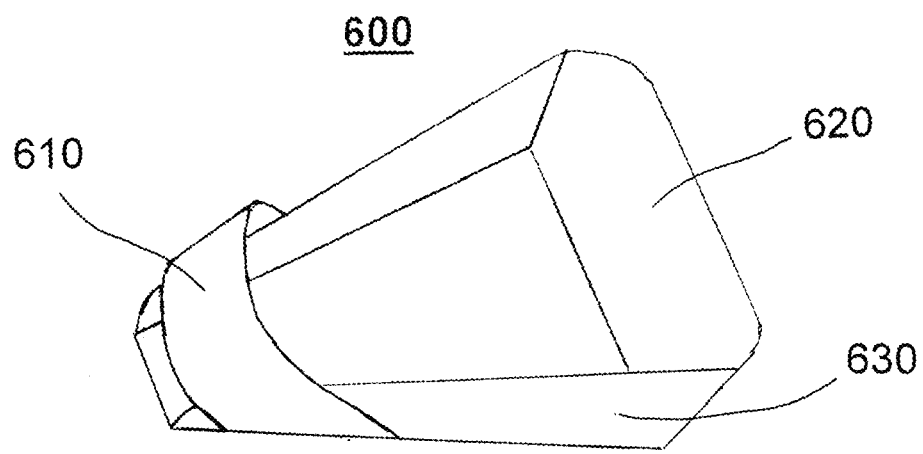
FIG. 6A is a perspective view of an alternative trapezoid-shaped weighing base having a funnel holder in the front according to the present invention.
Figure 6B:
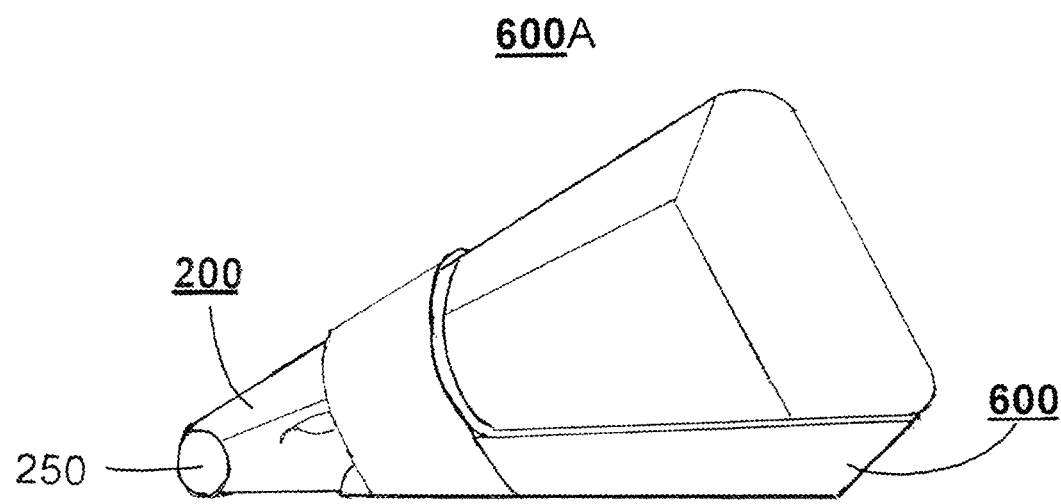
FIG. 6B is a perspective view of the trapezoid-shaped weighing kit comprising a weighing boat with a funnel portion in the upper layer and a weighing base with a funnel holder in the lower layer according to the present invention.
Figure 7A:
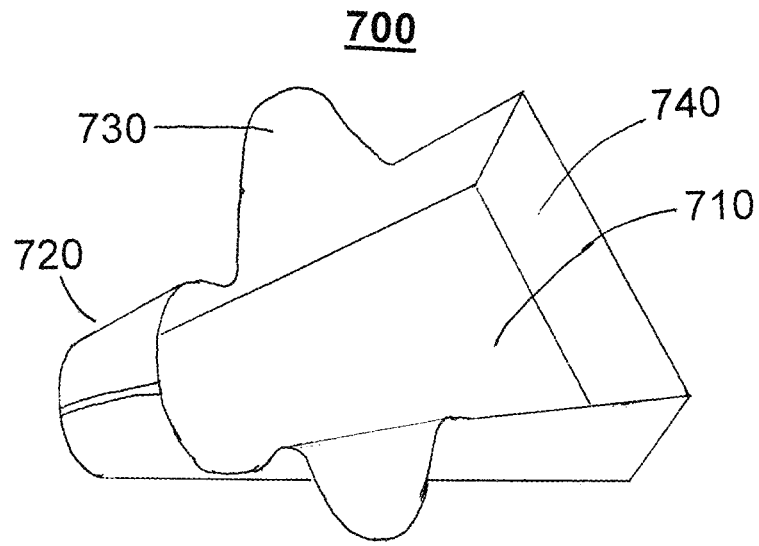
FIG. 7A is a perspective view of an alternative trapezoid-shaped weighing base having a funnel holder in the front and two side handles according to the present invention.
Figure 7B:
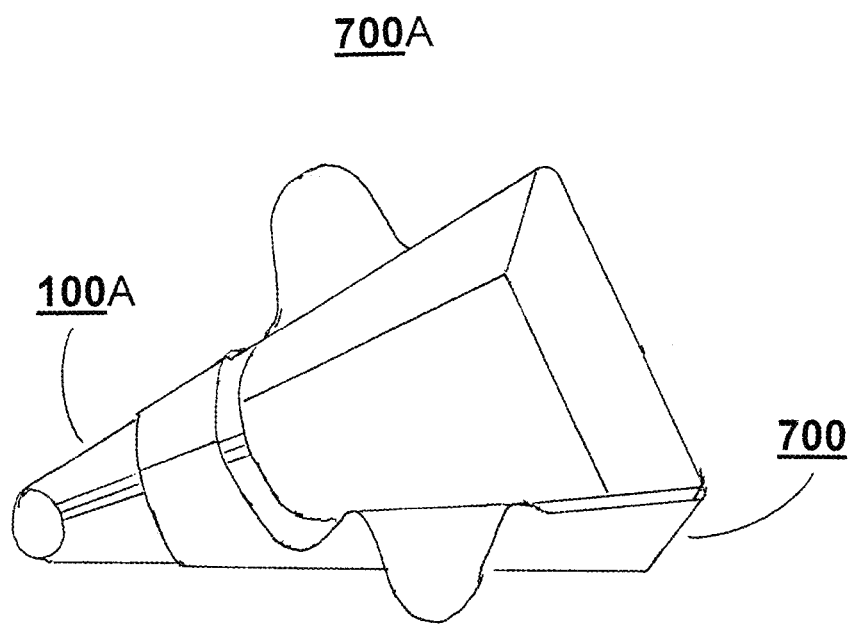
FIG. 7B is a perspective view of an alternative trapezoid-shaped weighing kit comprising a weighing boat with a funnel portion in the upper layer, and a weighing base with a funnel holder and side handles in the lower layer according to the present invention.

The cardboard-structured base 500 may permanently attach to weighing paper 100A to form a whole piece. The weighing base 500 is made of cardboard, hardboard, poster board, plastic, glass or metal sheet. The cardboard with an anti-static feature is a priority material for weighing base. It should be understood that the contouring and relative dimensions of the trapezoid shaped base 500 are shown for exemplary purposes only. FIG. 6A illustrates an embodiment of the equilateral trapezoid-shaped weighing base 600. In comparison to the weighing base 500, the weighing base 600 has a funnel holder 610, which can hold the weighing boat 100A more stably. FIG. 6B shows an embodiment of the trapezoid-shaped weighing kit 600A. The weighing boat 100A with permanent fold lines easily fits the corresponding weighing base 600. However, without the fold lines, the weighing boat 100A can also fit the weighing base 600. The weighing boat 100 with opened funnel portions 122 can be rolled into a funnel-shape to be inserted into the weighing base 600. The funnel opening 130 crosses through the funnel holder 610 to insert into the opening of a flask, which allows for easy transfer of samples while preventing contamination of weighing base 600. For smoothly transferring samples, the funnel openings 130 preferably fit the commercially available flasks with standard ground joint openings such as 10/7, 14/20, and 24/40. As is conventionally known, a size of 14/20, for example, means that the flask ground joint opening is fourteen millimeters in diameter and twenty millimeters in length. For fitting the 10/7 standard ground joint, the diameter of the funnel opening 130 must fall between 6 and 8 millimeter. For fitting 14/20 and 24/40 ground joints, these measurements are between 8-11 and 12-20 millimeters, respectively. FIG. 7A shows an alternative embodiment of the equilateral trapezoid-shaped weighing base 700, which has two more side handles 730 than weighing base 600. The weighing boat 100A is inserted into the weighing base 700 to comprise the weighing kit 700A as shown in FIG. 7B. However, since the handle 730 is on side, the back walls for both weighing boat 100A and weighing base 700 can be opened. The weighing base 700 is preferably made of metal material for re-use.

It is to be understood that the present invention is not limited to the embodiments described above, but encompasses any and all embodiments within the scope of the following claims.

We claim:

1. A laboratory weighing kit for holding and transferring chemicals or samples comprising:
   a disposable paper-structured weighing boat in an upper layer, the weighing boat having a funnel portion in a front end, a sample loading portion in the rear, two side walls and a back wall wherein the funnel portion in the front is configured to be opened to form two portions, wherein the opened two funnel portions are configured to rolled into a funnel shape.

2. The laboratory weighing kit of claim 1, wherein the funnel portions have an insert and a split, respectively, wherein the insert is configured to be inserted into the split to form a closed funnel.

3. The laboratory weighing kit of claim 1, wherein one funnel portion has a split in the rear side and another one has a split in the front side, wherein the splits are configured to be cross-inserted together to become a closed funnel.

4. The laboratory weighing kit of claim 1, wherein the weighing boat is creased to form a permanent fold lines.

5. The laboratory weighing kit of claim 1, wherein the back wall of the weighing boat is opened.

6. The laboratory weighing kit of claim 1, wherein the funnel opening has a diameter between 6 and 20 millimeters.

7. The laboratory weighing kit of claim 1, wherein the weighing boat has no funnel portion in the front.

8. The laboratory weighing kit of claim 1, further comprising a structured weighing base in a lower layer to hold the paper-structured weighing boat in upper layer, the weighing base having a funnel holder in a front end, two side walls, and a back wall.

9. The laboratory weighing kit of claim 8, wherein the weighing boat and the weighing base have a complementary trapezoid shape.

10. The laboratory weighing kit of claim 8, wherein the back wall of the weighing base is opened.

11. The laboratory weighing kit of claim 8, wherein the weighing boat in upper layer is removable from the weighing base in lower layer.

12. The laboratory weighing kit of claim 8, wherein the weighing boat in upper layer permanently attaches to the weighing base in lower layer.

13. The laboratory weighing kit of claim 8, wherein the weighing base is made of cardboard, hardboard, poster board, metal sheet, glass or polymer.

14. The laboratory weighing kit of claim 8, wherein the weighing base has a handle on each side or one side.

15. A laboratory weighing kit for holding and transferring chemicals or samples comprising:
- a disposable paper-structured weighing boat in an upper layer, the weighing boat having a funnel portion in a front end, a sample loading portion in the rear, two side walls and a back wall wherein the funnel portion in the front is configured to be opened to form two portions,
- wherein the weighing boat is creased to form a permanent fold lines,
- wherein the opened two funnel portions are configured to rolled into a funnel shape, and the funnel portions have an insert and a split, respectively, wherein the insert is configured to be inserted into the split to form a closed funnel.

* * * * *